Aug. 31, 1965    SHIGETOH IKUNO    3,203,894
METHOD FOR THE CONVERSION OF SEA WATER INTO FRESH WATER
Filed July 11, 1962
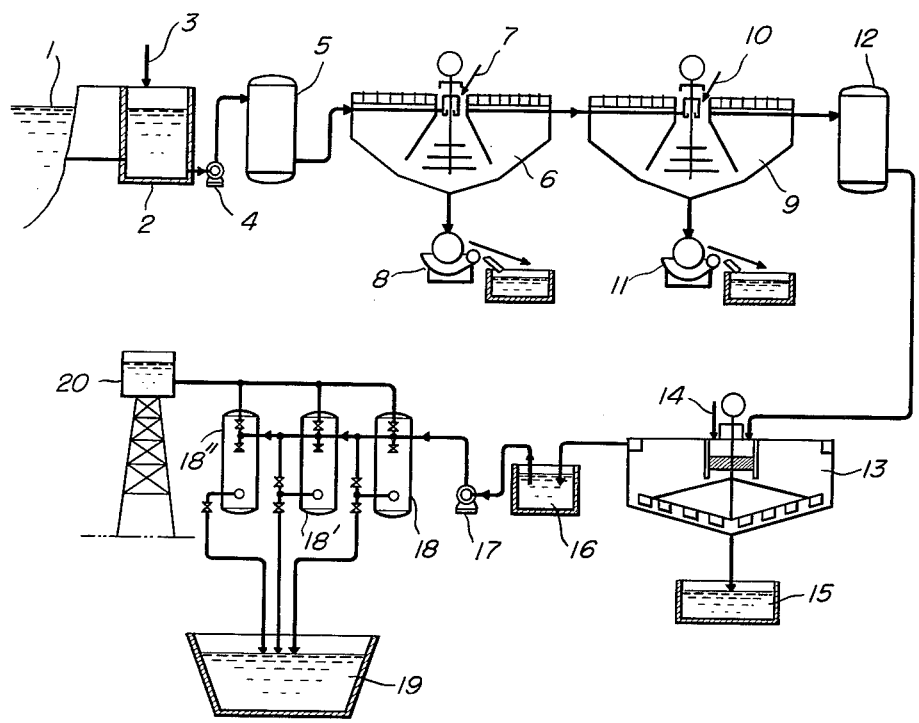

3,203,894
METHOD FOR THE CONVERSION OF SEA WATER INTO FRESH WATER
Shigetoh Ikuno, 3571 Tateishi-cho, Ikeda, Osaka, Japan
Filed July 11, 1962, Ser. No. 209,058
1 Claim. (Cl. 210—53)

This invention relates to a new and useful method for the conversion of sea water into fresh water.

Sea water is an accumulation of all kinds of dirty waters and wastes from every part of the world and contains such various kinds of salts that it would be virtually impossible to express all the chemical changes of the salts by chemical equations. However, sea water comprises $H_2O$ and various salts such as NaCl, $MgCl_2$, $MgSO_4$, KCl, and $CaSO_4$, and the precentages of its chemical elements are approximately as follows: O, 85.89; H, 10.32; Cl, 1.90; Na, 1.06; Mg, 0.13; S, 0.088; Ca, 0.040; K, 0.038; and others, 0.034.

In order to produce fresh water from sea water, it is necessary to remove those salts from it.

Various methods are known for this purpose such as (1) the solar evaporation method (2) the evaporation method, (3) the refrigeration method, and (4) the ion-exchange resin method.

The solar evaporation method, which uses solar heat as heating energy, requires such a long time for the process as to make the method impractical. In the evaporation method, sea water is evaporated by any suitable energy other than from the sun to produce vapor, which is liquified by cooling. The vapor, however, cannot be freed of various inorganic salts and organic impurities that have been gasified during the process of evaporation, so that the resulting water contains such gasified substances, which render the water inappropriate for industrial use. Such is the case with the refrigeration method, wherein ice produced by refrigeration of sea water is contaminated with various impurities, which make the water obtained by heating the ice inappropriate for industrial use. Finally, the ion-exchange resin method is successful in the laboratory, but it is to expensive to be profitably used on an industrial scale. The method also has the disadvantage of removing silicon only with difficulty from sea water.

The disadvantages and difficulties encountered in the prior art have been overcome by the method of the invention.

It is an object of this invention to provide a new and useful method for the conversion of sea water to fresh water by removing therefrom various salts and organisms, the method being characterized by the use of activated carbon.

Another object of the invention is to provide such a method in a form which is advantageously applicable on an industrial scale, wherein by-products obtained dur- the process help reduce the operation cost to a great extent.

Still another object of the invention is to provide such a method which is simple and safe in operation.

The method of the present invention comprises the steps of: filtering sea water to remove therefrom various filtering organic bodies; conveying the water to a primary forced precipitation tank where suitable purifying agents, such as calcium oxide, calcium hydroxide, sodium carbonate and aluminum sulfate, are added to the sea water so as to precipitate chlorides and sulfides of calcium, magnesium, and the like as insoluble compounds which are to be separated therefrom; delivering the supernatant solution to a secondary forced precipitation tank where the remaining salt in the solution is reacted with added chemicals containing for example, ammonia and carbonates so as to form sodium bicarbonate, which precipitates and is separated from the solution; then subjecting the supernatant solution in a secondary tank to further filtration by the use, for example, of an activated carbon filter so as to remove from the solution ammonium chloride contained therein; then conveying the resulting liquid to another precipitation tank, where the pH of the liquid is adjusted; and completing the process by a further filtration step through activated carbon.

The objects, advantages and characterizing features of the present invention will be clearly apparent from the ensuing detailed description of an embodiment thereof, with reference to the accompanying drawing showing a flow sheet of the process of the invention.

Referring to the flow sheet, sea water is taken from the sea 1 and conveyed to a storage tank 2. It is desirable to remove as clean sea water as possible, whereby the piping system for this purpose is arranged so that it will extend as far from the shore as possible, for example, 200 meters or even as far as 3,000 meters offshore, while being at a depth greater than 20 meters.

Many different kinds of salts exist in sea water, so it is necessary for the pipes of the system to be lined with a suitable material which is resistive to acids in order to protect the pipes against corrosion. The sea water which is collected in the tank 2 contains various organisms such as spores of seaweeds, spawns, small fishes and shells, planktons, which must be first removed. To this end, the tank 2 is provided with an opening 3, through which a suitable amount of chloride gas or potassium permanganate is added to kill those organisms, or suppress their growth or regeneration. The sea water thus treated is then passed through an activated carbon filter 5 for removal of those organic impurities. The sea water thus purified is next sent to a primary forced precipitation tank 6 provided with an opening 7, through which such purifying agents as calcium oxide (CaO), calcium hydroxide ($Ca(OH)_2$), sodium carbonate ($Na_2CO_3$), together with aluminium sulfate ($Al_2(SO_4)_3 \cdot 18H_2O$), are added to the sea water so as to precipitate chlorides and sulfates of magnesium and calcium, as the insoluble compounds, after which they may be separated in a suitable manner. The principal chemical reactions that take place during the process may be expressed by the following equations:

$$MgCl_2 + Ca(OH)_2 + Na_2CO_3 = Mg(OH)_2 + CaCO_3 + 2NaCl$$
$$MgSO_4 + Ca(OH)_2 = Mg(OH)_2 + CaSO_4$$

It will be observed from the above that the sea water has been purified of the calcium and magnesium contained therein by precipitating them as magnesium hydroxide and calcium sulfate and then removing the precipitates. The addition of aluminium sulfate serves to promote the formation and precipitation of the hydroxide and sulfate, thereby making possible the use of a small-scale precipitation tank with much the same efficiency as that of a larger one. The aluminium sulfate also helps eliminate the small amount of silicates contained in the sea water.

The precipitates of magnesium hydroxide ($Mg(OH)_2$) and calcium sulfate ($CaSO_4$), which have been separated by a filter 8, may be utilized for respective purposes; thus the former may be used as material for the production of magnesium compounds while the latter may be converted to gypsum.

The supernatant solution from the primary precipitation tank 6 is transferred to a secondary forced precipitation tank 9.

The solution contains a large amount of sodium chloride (NaCl), which must also be disposed of. To this end, sufficient amounts of chemicals such as ammonium bicarbonate ($NH_4HCO_3$), ammonia ($NH_3$), and carbon dioxide ($CO_2$) are added to the solution to produce sodium bicarbonate ($NaHCO_3$) and ammonium chloride ($NH_4Cl$). The reactions may be represented as follows:

$$NaCl + NH_4HCO_3 = NaHCO_3 + NH_4Cl$$
$$NaCl + NH_3 + H_2O + CO_2 = NaHCO_3 + NH_4Cl$$

The resulting sodium bircarbonate precipitates and is separated by a filter 11, after which the compound is burnt in a suitable kiln in which it will decompose into sodium carbonate and carbon dioxide in accordance with the following formula:

$$2NaHCO_3 = NaCO_3 + CO_2 + H_2O$$

The by-products thus obtained, that is, sodium carbonate and carbon dioxide, may be utilized in suitable steps of the process of the invention. This is another advantage of the method of the invention.

The supernatant solution in the secondary forced precipitation tank 9 contains ammonium chloride produced by the above-mentioned reaction. In order to remove this compound, the solution is passed through a rapid type of perforated activated carbon filter 12 to separate the ammonium chloride.

In the above way, the sea water has been purified of organic impurities and inorganic salts of Ca, Na, Mg, and the like. So far, however, the purification is not complete, since there may still remain in the water small amounts of salts and organic substances, which have to be eliminated to finish up the process. For this purpose, the water is sent to a precipitation and concentration tank 13 where the remaining impurities are removed. The tank 13 is also provided with an opening 14 to enable the introduction of suitable chemicals into tank 13 whereby the adjustment of the pH of the liquid is effected. The precipitates formed in the tank 13 are gathered into a tank 15 for discharge while the remaining water is poured into a storage tank or reservoir 16, from which it is passed by a pump 17 through a series of rapid filters 18, 18', 18" to make the filtration perfect, the filters adsorbing any impurities remaining in the passing water. Thus, fresh water is collected in a tank 19. In the flow sheet the numeral 20 designates a tank containing sulfuric acid for washing of the filters 18, 18' and 18".

Experiments have disclosed that the method of the invention reduces the amount of salts contained in sea water making the resulting water satisfactory for industrial use.

The following is an analysis table of sea water treated by the method of the invention:

|  | Specimen I | | Specimen II | |
| --- | --- | --- | --- | --- |
|  | Sea water | Finished liquid | Sea water | Finished liquid |
| pH | 7.8 | 6.1 | 7.7 | 5.6 |
| Total solid bodies | 33.565 | 4.030 | 29.260 | 3.150 |
| Fixed residue | 28.335 | 3.210 | 24.876 | 2.771 |
| Silicic acid | 4.16 |  | 5.80 |  |
| Iron | 4.75 | 0.11 | 4.50 | 0.2 |
| Calcium | 326 |  | 275 |  |
| Magnesium | 1.164 |  | 1.027 |  |
| Chlorine | 17.319 | 1.772 | 14.769 | 980 |
| Sulfuric acid | 1.150 | 223 | 1.858 | 133 |
| Oxygen dissolved | 2.83 |  | 2.07 |  |
| Nitrous acid | 0.1 | 0.04 | 0.19 | 0.01 |
| Nitric acid | 0.95 | 0.4 | 0.97 | 0.25 |
| Ammonia | 0.03 | 0.01 | 0.03 | 0.001 |
| Potassium permanganate consumed | 12 | 6.4 | 9 | 6.4 |
| Taste |  | (²) |  | (¹) |
| Odour |  | (²) |  | (²) |
| Color |  | (²) |  | (²) |
| Turbidity |  | (³) |  | (³) |

¹ Slightly sweet.
² None.
³ Transparent.

What is claimed is:

In the treatment of sea water by adding thereto calcium hydroxide to precipitate magnesium hydroxide, calcium sulfate and calcium carbonate, and simultaneously adding aluminum sulfate to promote the formation and precipitation of the hydroxide and sulfate, an improvement which comprises removing the precipitates, adding to the supernatant thus obtained a reagent selected from the group consisting of ammonium bicarbonate and a combination of ammonia and carbon dioxide to produce sodium bicarbonate and ammonium chloride, filtering off said sodium bicarbonate, and then treating the filtrate containing said ammonium chloride with activated carbon.

References Cited by the Examiner

UNITED STATES PATENTS

| 1,968,845 | 8/34 | Morrell | 252—421 |
| 2,074,082 | 3/37 | Domogallia | 210—53 |
| 2,350,111 | 3/44 | Hood | 210—53 |

OTHER REFERENCES

Betz: "Handbook of Industrial Water Conditioning," 5th edition, copyright 1957, Betz Laboratories, Inc. (pp. 30–37 relied on).

MORRIS O. WOLK, *Primary Examiner.*